United States Patent [19]

Amin

[11] 4,452,389
[45] Jun. 5, 1984

[54] METHOD FOR WELDING WITH THE HELP OF ION IMPLANTATION

[75] Inventor: Kamal E. Amin, Columbia, Md.

[73] Assignee: The Bendix Corporation, Southfield, Mich.

[21] Appl. No.: 365,810

[22] Filed: Apr. 5, 1982

[51] Int. Cl.³ .............................................. B23K 20/00
[52] U.S. Cl. ..................................... 228/203; 228/193; 228/114; 228/116
[58] Field of Search ............... 228/114, 116, 117, 193, 228/194, 203

[56] References Cited

U.S. PATENT DOCUMENTS

| | | | |
|---|---|---|---|
| 2,879,587 | 3/1959 | Mushovic et al. | 29/488 |
| 3,394,241 | 7/1968 | Sparrow et al. | 219/118 |
| 3,431,150 | 3/1969 | Dolan, Jr. et al. | 148/1.5 |
| 3,793,705 | 2/1974 | Cole et al. | 29/473.1 |
| 3,956,666 | 5/1976 | Reader et al. | 315/111.8 |
| 4,011,982 | 3/1977 | Marancik | 228/208 |
| 4,245,768 | 1/1981 | Sater | 228/116 |

OTHER PUBLICATIONS

H. E. Pattee et al., "The Joining of Dissimilar Metals", Defense Materials Information Center, DMIC Report 5-16, Jan. 68.
W. A. Owezarski and D. S. Duvall, "Advanced Diffusion-Welding Process", New Trends in Materials Processing, SAM Materials Science Symposium, Detroit, Oct. 74.
P. M. Bartle, "The Implications of Reducing Diffusion Bonding Temperatures", Advanced Welding Processes, vol. 1, May 1978.
W. J. Choyke, "Prospects for Ion Implantation as a New Surface Treatment Technology", SAMPE Journal, Mar./Apr. 1980.

Primary Examiner—Kuang Y. Lin
Attorney, Agent, or Firm—James R. Ignatowski; Russel C. Wells

[57] ABSTRACT

The invention is a method for welding together two parts with the help of ion implantation. The method comprises weakening the chemical and atomic bonds of the surface and near surface atoms of at least one of the surfaces to be welded together by ion implantation techniques. The ion implanted surface may then be cold or diffusion welded to the surface of the other part using conventional methods. The method is particularly applicable to welding together parts of dissimilar metals normally difficult to affect a satisfactory weld.

25 Claims, 4 Drawing Figures

METHOD FOR WELDING WITH THE HELP OF ION IMPLANTATION

BACKGROUND OF THE INVENTION

1. Field of the Invention

The invention is related to the field of welding dissimilar metals and in particular to welding aided by the modification of the chemical composition and morphology of the surfaces to be joined.

2. Prior Art

The concept of joining dissimilar metals using intermediate compatable layers, acting as a barrier to the diffusion of undesirable elements from one surface to the other was introduced in the late 1960's, H. E. Pattee, R. M. Evans and R. E. Monroe, "The Joining of Dissimilar Metals", *Battelle Memorial Institute, Defense Metals Information Center*, DMIC Report #S-16, January 1968. This initial concept was later modified and refined for specific applications and given various names, such as eutectic welding and diffusion brazing, W. A. Osczarski and D. S. Duvall, "Advanced Diffusion Welding Process", *New Trends in Materials Processing*, SAM Materials Science Symposium, Detroit, Mich., Oct. 19-20, 1974 and P. M. Bartle "Diffusion Bonding: A Look at the Future", *British Welding Journal*, Vol. 54, No. 7, 1975. In these methods, the intermediate layer was in the form of a foil, an electroplated layer, or a vacuum deposited layer as disclosed by Marancik in U.S. Pat. No. 4,011,982.

With these methods, the diffusion effects of the bond were not fully controlled and the formation of liquid during the joining process often resulted in the formation of brittle intermediate phases, degrading the ductility of the joint. Additionally, the formation of liquid led to uncontrolled consumption of the pieces being joined, thereby resulting in uncontrolled dimensional stability.

The effects of intermediate layer thickness and properties on the strength of the formed joints have been assessed, and it was found that in specific cases the bond strength was an inverse function of the intermediate layer thickness above 100 micrometers, A. M. Bartle, "The Implications of Reducing Bonding Temperature", *Advances in Welding Processes*, Vol. 1, May 1978 and R. Z. Shron, "The Problem of Gauging the Strength of Welded Joints in which there is a Soft Interlayer", *Welding Production*, Vol. 9, No. 9, 1962.

Disclosed is a method for modifying the surface chemistry of the parts to be joined which eliminates the problems of the prior art discussed above and results in superior welds between dissimilar metals.

SUMMARY OF THE INVENTION

The invention is a method for joining dissimilar metals. The method comprises modifying the chemical composition and structure of the surfaces to be joined by ion implantation of predetermined elements. The ion implanted surfaces accelerate the diffusion coefficients of the dissimilar metals by both increasing the density of defects at and near the surface and by reducing the chemical bond of the surface and near surface atoms, such as an oxide layer, thereby promoting excellent subsequent bonding. The ion implanted surfaces may then be joined by cold rolling in vacuum or diffusion bonding in an inert or vacuum atmosphere using standard bonding techniques.

The advantage of disclosed method is that the bonded joint is more uniform and significantly stronger than that achieved by the prior art. Further, the dissimilar surfaces may be joined at lower pressures and temperatures resulting in minimal deformation of the joined parts and improved dimensional stability. These and other advantages of the process will be apparent from a reading of the specification in conjunction with the appended drawings.

BRIEF DECRIPTION OF THE DRAWINGS

DETAILED DESCRIPTION OF THE INVENTION

Figure 1:
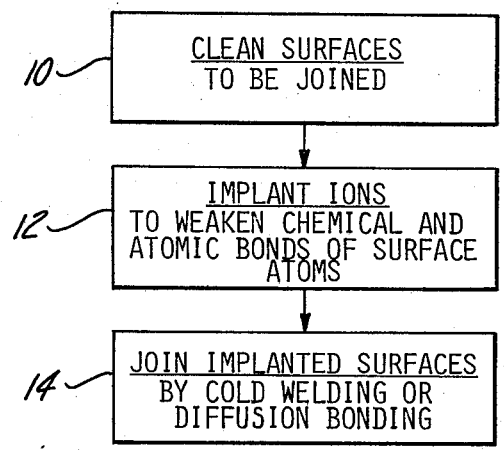
FIG. 1 is a flow diagram of the disclosed process.

The invented process for joining dissimilar metals will first be discussed with reference to the flow diagram of FIG. 1. Referring to FIG. 1, the dissimilar metal parts to be joined are cleaned using conventional cleaning techniques applicable to cold welding and/or diffusion bonding as indicated in block 10. Ions are then implanted in at least one of the surfaces to weaken the chemical bonds of the surface and near surface atoms as indicated in block 12. The ion implanted surfaces are then joined by cold welding or diffusion bonding as indicated in block 14. The latter step is preferably performed in a vacuum or inert atmosphere using conventional procedures.

For effective bonding the density of implanted ions should range between $10^{14}$ to $10^{19}$ ions per square centimeter. Preferably, the ion source should produce an ion beam having a beam energy in excess of 100 KV and have an ion current density of greater than 1 milliampere per square centimeter (1 ma/cm$^2$). As is known in the ion implantion art, the angle of incidence, beam size and shape and part rotation should be adjusted to ensure that the implanted layer has a thickness of greater than 100° A. over the areas to be joined.

Figure 2:
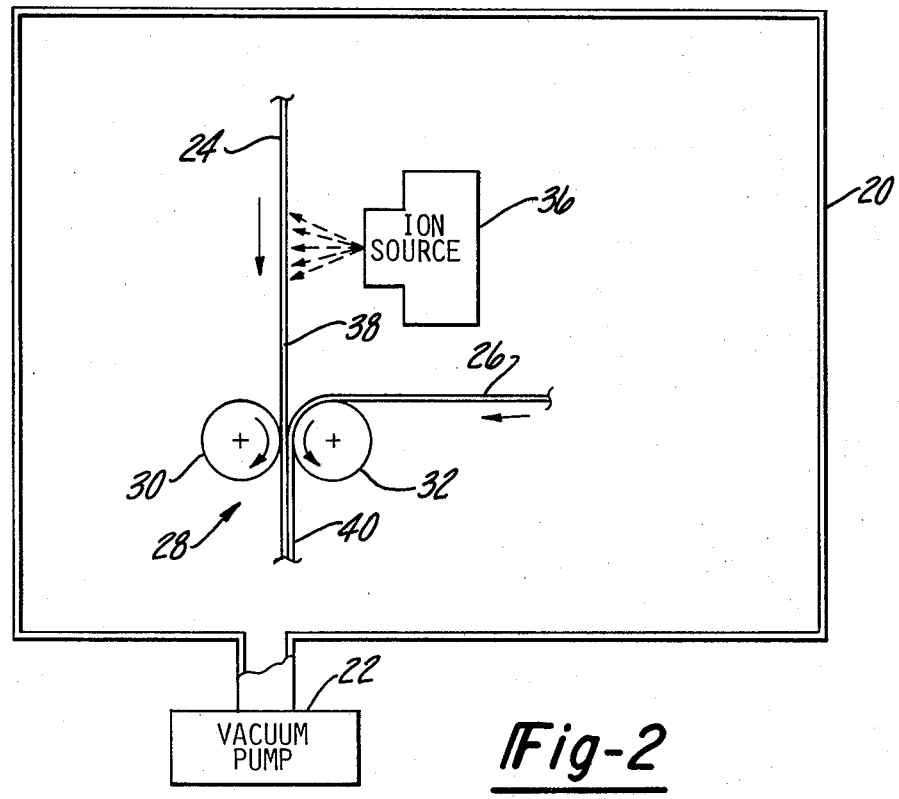
FIG. 2 is a first apparatus employing the disclosed process.

The method will now be described with reference to the apparatus shown in FIG. 2. Referring to FIG. 2, there is shown a vacuum chamber 20 having a vacuum pump 22 operative to evacuate the vacuum chamber 20 to a pressure of less than $10^{-5}$ Torr. Inside of the vacuum chamber 20 are feed mechanisms (not shown) operative to feed two dissimilar metal sheets 24 and 26 to a roller mechanism 28 pictorially illustrated by counter rotating rollers 30 and 32. A high energy ion source 36 is disposed to implant preselected ions in surface 38 of sheet 24 upstream of the roller mechanism 28.

The operation of the apparatus of FIG. 2 is as follows: Precleaned sheets of dissimilar metals 24 and 26 are placed in the feed mechanisms and the vacuum chamber 20 evacuated to a pressure of less than $10^{-5}$ Torr. When the vacuum chamber 20 reaches the desired pressure, the feed mechanisms are activated to simultaneously feed sheets 24 and 26 towards the roller assembly 28. As sheet 24 passes the ion source 36 upstream of the roller mechanism 28 high energy ions are implanted into surface 38 to a depth of 100° A. or more. The implanted ions break down the chemical bond between the surface and near surface atoms and introduce high defect concentrations on surface 38 of sheet 24. The break down of the chemical bond of the surface atoms and the introduction of defects in surface 38 accelerate the diffusion coefficient of sheet 26's material into the surface 38 of sheet 24.

Sheet 24 and 26 are subsequently joined at the roller mechanism 28 with ion implanted surface 38 adjacent to sheet 26. As sheets 24 and 26 pass through roller mechanism 28, the compressive force exerted by rollers 30 and 32 brings the opposing surfaces in intimate contact, thus establishing atomic bonding at the interface and helps the material of sheet 26 to diffuse into the ion implanted surface 38 of sheet 24. This diffusion produces a cold weld joining sheets 24 and 26 into a welded sheet 40. Because the diffusion of the material of sheet 26 into the sheet 24 is accelerated by the ion implantation process, the force exerted by the roller mechanism 28 to affect the cold weld is significantly reduced. Raising the temperature of the sheets 24 and 26 further reduces the required force and permits the roller mechanism to be operated at a faster speed increasing the throughput of the apparatus. It is recognized that for certain materials, it may also be necessary to implant ions in the surface of sheet 26. In these instances, a second ion source similar to ion source 36 may be added to ion implant the surface of sheet 26 upstream of the roller mechanism 28.

Figure 3:
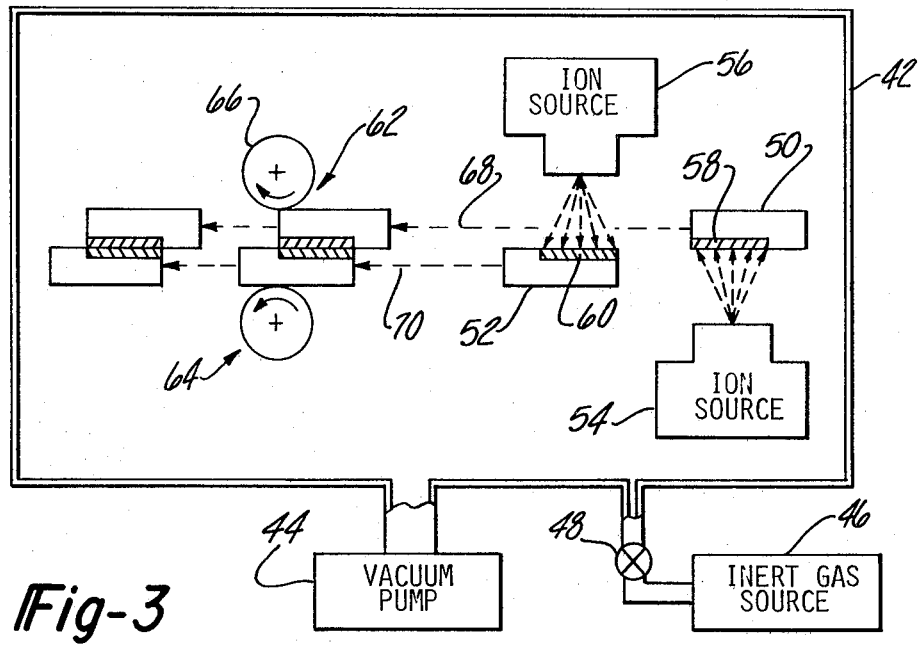
FIG. 3 is an alternate apparatus employing the disclosed process.

An alternate apparatus for cold welding small parts is illustrated in FIG. 3. Referring now to FIG. 3, there is shown a vacuum chamber 42 and an associated vacuum pump 44. There is also provided a source of inert gas 46 connected to the vacuum chamber 44 through a valve 48. Two parts 50 and 52 made from dissimilar metals to be joined are supported by a transfer mechanism (not shown) adjacent to respective ion sources 54 and 56 respectively. The ion source 54 is operative to implant ions in one surface of part 50 over a predetermined surface area 58. In a like manner ion source 56 is operative to implant ions in one surface of part 52 over a predetermined surface area 60. The apparatus further includes mechanism for applying a compressive force, such as a roller mechanism 62 comprising roller 64 and 66.

The operation of the apparatus of FIG. 3 is as follows: The cleaned parts 50 and 52 are placed in their respective transfer mechanisms and positioned relative to their respective ion sources 54 and 56. The vacuum chamber 42 is then evacuated to a pressure of less than $10^{-5}$ Torr. Ion source 54 is then activated to produce an ion implanted surface 58 in part 50. Then ion source 56 is activated to produce an ion implanted surface 60 on part 52. As is known in the art, shadow masks or other methods may be used in connection with the ion source or transfer mechanism to define the predetermined ion implanted surface areas 58 and 60. It is recognized that in specific cases, the same ions will be able to weaken the chemical bond of the surface atoms in both parts. In these specific cases, only one ion source may be used to implant ions into the surfaces of both parts either simultaneously or sequentially.

After the ions have been implanted, the parts 50 and 52 are transferred to the roller mechanism 62 as pictorially represented by dashed arrows 68 and 70 with their implanted surfaces 58 and 60 in register with each other. The roller mechanism 62 is then activated to affect the cold weld between parts 50 and 52.

The cold weld may be affected in a vacuum atmosphere as described with references to FIG. 2 or the vacuum pump 44 may be turned off and the vacuum chamber 42 back filled with an inert gas through valve 48 and the cold weld affected in an inert atmosphere.

After the cold welding is affected, the joined parts 50 and 52 may be diffusion annealed to relieve stresses introduced during the earlier processing (ion implantation) and to allow for the diffusion of the implanted ions to produce a stronger and thermally stable bond. It must be noted that even after the low temperature annealing, the bonded interface extends only a thickness of a few atomic distances which helps significantly to maintain the properties of the parts.

Figure 4:
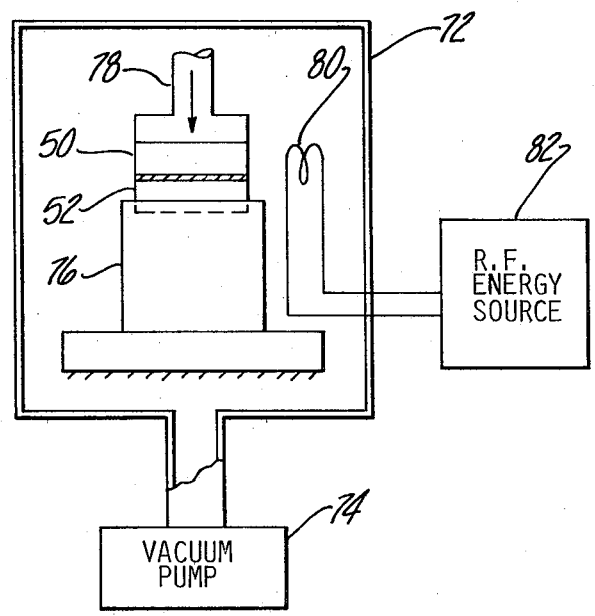
FIG. 4 is a diffusion welding apparatus utilizing the disclosed process.

As an alternative to cold welding the ion implanted surfaces may be diffusion bonded using an apparatus as shown in FIG. 4. Referring to FIG. 4, there is shown a typical diffusion bond apparatus having a chamber 72 and vacuum pump 74. Mounted in the chamber 72 is a lower support member 76 for holding part 52 and an upper support member 78 for holding part 50 in a desired registration with respect to part 52. Means (not shown) are also provided for exerting a force on the upper support member 78 urging the ion implanted surface 58 of part 50 in intimate contact with a corresponding surface of part 52. The corresponding surface of part 52 may be an ion implanted surface, such as surface 60 discussed relative to FIG. 3 or may be just a clean surface. The apparatus of FIG. 4 also includes means for heating parts 50 and 52 to a predetermined temperature below the melting point of the part having the lowest melting point. This heating may be accomplished by an induction heater comprising one or more coils 80 and source of R.F. energy 82. Alternatively, the parts 50 and 52 may be heated with radiant energy from an electrical heating element. The heating may be accomplished in a vacuum atmosphere or inert atmosphere as is known in the art.

The operation of the apparatus of FIG. 4 is as follows: Either dissimilar metal parts 50 or 52 or both have the surface and/or surfaces to be joined implanted with ions as discussed relative to FIG. 3. The parts are then placed in the diffusion apparatus shown in FIG. 4. The chamber 72 is then evacuated and a force applied between the upper and lower support members 76 and 78 urging the two surfaces to be joined into intimate contact with each other. The induction heater 80, 82 is then activated to heat the parts to the predetermined temperature for a time determined to permit the desired diffusion of the ion implanted surfaces. The chamber 72 is then back filled with an inert gas and the parts removed.

As is known in the art, the chamber 72 may be back filled with an inert gas prior to the heating step.

Specific examples of dissimilar metals whose welding is facilitated by ion implantation are as follows:

| Metals and/or Alloys to be joined | Implanted Ions |
|---|---|
| titanium alloys to steels (including stainless steels) | Molybdenum (Mo) Silver (Ag) Niobium (Nb) |
| aluminum alloys to steel (including stainless steels) | Titanium (Ti) Nickel (Ni) |
| molybdenum alloys to tungsten alloy | Nickel (Ni) |

The above listing is not intended to be all inclusive, and it is recognized that other difficult to weld dissimilar metals and alloys can be facilitated by ion implantation of the surfaces to be joined, and that ions, other than those listed, may in the future be shown to produce better results.

The key to the invention is the use of ion implantation to weaken the chemical bonds of the surface and near surface atoms and to accelerate diffusion in the areas to be joined. Whether the subsequent welding of the two parts is made by cold welding, diffusin welding or any other welding process known in the art is of secondary significance. It is anticipated that those skilled in the art can conceive of different ways to affect the welding of the ion implanted surfaces without departing from the spirit of the invention as described in the specification and set forth in the appended claims.

What is claimed is:

1. A method for enhancing welding of at least two metal parts comprising the steps of:
   cleaning the surfaces of the metal parts to be joined;
   implanting ions into the surface to be welded of at least one of said two parts to a depth of at least 100 angstroms to weaken the chemical and atomic bonds of the surface and near surface atoms; and
   welding said ion implanted surface of said at least one part to a clean surface of the other part.

2. The method of claim 1 wherein said step of implanting ions further includes the step of implanting ions into the surface to be welded of the other part to a depth of at least 100 angstroms to weaken the chemical bonds of the surface and near surface atoms of said other part.

3. The method of claims 1 or 2 wherein said step of implanting ions implants predetermined metal ions to a depth greater than 100 angstroms.

4. The method of claim 1 wherein said step of welding comprises the steps of:
   placing the ion implanted surface of said at least one part adjacent to a clean surface of said second part; and
   applying an external force urging said ion implanted surface of said at least one part into intimate contact with the clean surface of said other part to cause a diffusion of the material of said at least one part with the material of said other part.

5. The method of claim 4 wherein said step of applying an external force comprises the step of passing said parts through a roller mechanism exerting said mechanical force.

6. The method of claims 1 or 4 wherein said metal parts are made from dissimilar metals.

7. The method of claims 1 or 4 wherein said step of welding is performed in a vacuum atmosphere.

8. The method of claims 1 or 4 wherein said step of welding is performed in an inert gas atmosphere.

9. The method of claim 4 wherein the parts are made from dissimilar materials having different melting points, said step of welding further includes the step of heating said parts with their surfaces in intimate contact to a predetermined temperature below the melting temperature of the part having the lowest melting point to enhance the diffusion rate of the material of said at least one part with the material of said other part.

10. The method of claim 9 wherein said step of heating includes the step of induction heating.

11. The method of claim 9 wherein said step of heating includes the step of radiant heating.

12. The method of claim 9 wherein said step of heating is performed in a vacuum atmosphere.

13. The method of claim 9 wherein said step of heating is performed in an inert atmosphere.

14. A method for welding together two parts made from dissimilar metals comprising the steps of:
   implanting predetermined ions to a depth greater than 100 angstroms into the surface of one of said parts to be welded to the other part;
   placing said ion implanted surface in intimate contact with the surface of said other part; and
   applying a force across the contacting area of the two parts sufficient to establish atomic bonds across the interface and diffuse the metal of the first part with the dissimilar metal of the second part to affect a cold weld.

15. The method of claim 14 wherein said step of applying a force includes the step of passing said parts through a roller mechanism to affect said cold weld.

16. The method of claim 14 further including the step of implanting ions includes the step of implanting ions into the surface of the other part to be welded to the first part.

17. The method of claims 14 or 16 wherein said step applying a force is performed in a vacuum atmosphere.

18. The method of claims 14 or 16 wherein said step of applying a force is performed in an inert atmosphere.

19. The method of claims 14 or 16 wherein said step of implanting predetermined ions implants predetermined metal ions to a depth greater than 100 angstroms.

20. A method for welding together two parts of dissimilar metals having different melting points comprising the steps of:
   implanting predetermined ions to a depth greater than 100 angstroms into the surface of one of said parts to be welded to the other part;
   placing said ion implanted surface in intimate contact with a clean surface of said other part;
   applying a force across said contacting surfaces to hold them in intimate contact; and
   heating said parts to a predetermined temperature below the melting temperature of the part made from the metal having the lowest melting temperature to facilitate the diffusion of the metal of the first part with the dissimilar metal of the second part to affect a diffusion bond.

21. The method of claim 20 wherein said step of heating includes induction heating.

22. The method of claim 20 wherein said step of heating includes radiant heating.

23. The method of claim 20 wherein said step of heating is performed in a vacuum atmosphere.

24. The method of claim 20 wherein said step of heating is performed in an inert atmosphere.

25. The method of claims 21 or 22 wherein said step of implanting predetermined ions further includes the step of implanting predetermined ions into the surface of said other part to be welded to said first part.

* * * * *